Figure 1:
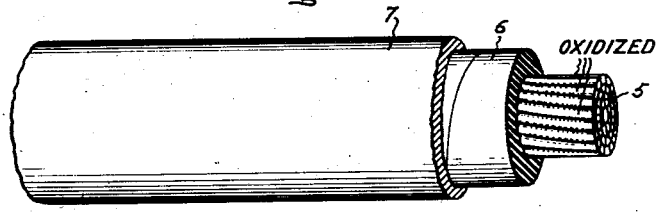

Oct. 26, 1943.  F. M. CLARK  2,332,891

MIGRATION PROOF ELECTRIC DEVICE

Filed Jan. 29, 1942

Inventor:
Frank M. Clark,
by Harry E. Dunham
His Attorney.

Patented Oct. 26, 1943

2,332,891

UNITED STATES PATENT OFFICE 2,332,891

MIGRATIONPROOF ELECTRIC DEVICE

Frank M. Clark, Pittsfield, Mass., assignor to General Electric Company, a corporation of New York Application January 29, 1942, Serial No. 428,725

8 Claims. (Cl. 175—41)

The present application is a continuation-in-part of my former application Serial No. 352,104 filed August 10, 1940.

This invention relates to electrical devices, such for example as transformers, capacitors and cables. It is especially applicable to those electrical devices which comprise in close juxtaposition one or more metal conductors and liquid-impregnated solid insulation, such for example as paper or fabric. Such insulation may be impregnated with mineral oil, liquid halogenated aromatic hydrocarbon, or other suitable liquid insulating material. An example of a device to which my invention is applicable is an electric cable which may comprise a conductor of copper, a surrounding layer of liquid-impregnated insulating fabric, and a surrounding metallic sheath. Another example is an electric capacitor which usually comprises armatures of metal foil and interleaved impregnated paper. In some cases intermediate terminals or tap straps are provided which are located in contact with the impregnated paper layer.

Electric failures of such devices frequently occur due to the migration of metal from a cable core, capacitor armature, tap strap or conductor into the liquid-impregnated insulating or dielectric layer. The speed and amount of metal migration depends on various factors, as for example the electric conductivity, chemical and other characteristics of the dielectric layer, the character of the adjacent metal, the voltage gradient, and the temperature of operation of the device. At voltage stresses of about 300 to 400 volts per mil and a temperature of 75° C., metal migration is pronounced even in a high resistance liquid. At higher voltage gradients the migration is pronounced at even 30° C.

Because of its high degree of conductivity, general availability and highly favorable chemical and physical properties, copper is the preferred conductor metal for transformers, cables and other electric devices. Copper, however, constitutes a metal most susceptible to metallic migration into the dielectric liquid or septum under voltage.

The migration of metal once started lowers the resistance of the dielectric and raises its power factor, thus intensifying the metal migration which then may occur at progressively lower voltage stresses and at lower temperatures. As a result, metal accumulates in the paper, fabric, or other liquid-impregnated solid insulation adjacent the metal members, thereby progressively increasing the power losses and decreasing the dielectric strength of the insulation until electric failure or breakdown occurs.

In accordance with my invention, such deleterious migration of metal is suppressed and, in any event, materially reduced by providing metal surfaces which are contiguous to dielectric surfaces with a thin, non-porous layer of a protective material which is firmly adherent to said surfaces. For example, in the case of copper, an oxide or sulphide of copper may serve as protective material.

Figure 2:
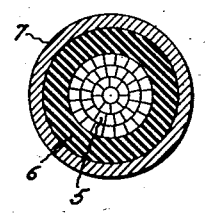
Figure 3:
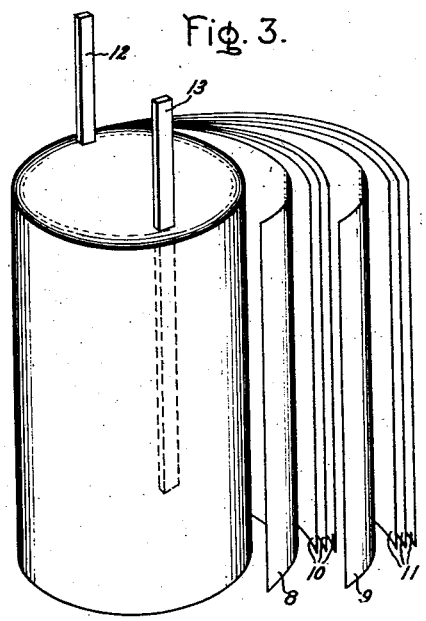
Figure 4:
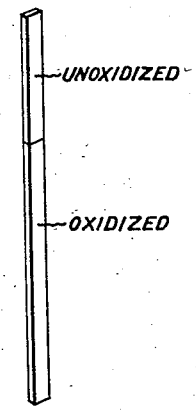

The accompanying drawing shows two kinds of electric devices embodying my invention. Figs. 1 and 2, respectively, are perspective and cross-sectional views of a length of cable; Fig. 3 is a perspective view of a capacitor partly unrolled; and Fig. 4 is a perspective view of a terminal.

The conductors 5 forming the core of an electric cable ordinarily are surrounded by a layer 6 of insulation consisting of paper, cotton, fabric or other insulating material which is susceptible of impregnation with a suitable non-conducting liquid, such, for example, as mineral oil, chlorinated diphenyl, chlorinated naphthalene or a suitable mixture. The impregnated layer 6 is surrounded by a metal sheath 7. The core conductors may consist, as shown, of a closely compacted bundle of individual wires. During use, when carrying current, the sheath is at ground potential and the core is charged with a different potential. Hence, an electric stress exists between the core and sheath.

A capacitor, as shown in Fig. 3, comprises armatures 8, 9 consisting of suitable conductive material and spacers 10, 11 consisting of suitable dielectric material. The armatures 8, 9 ordinarily consist of thin aluminum foil but they may consist of thin copper foil or of a tin-lead composition generally called "tinfoil," or, in fact, of any suitable metal. The spacers ordinarily consist of paper such as kraft tissue, such for example as described in Allen Patent 1,850,702, patented March 22, 1932. Three sheets of spacers are illustrated, but a lesser or greater number can be used. The terminal conductors 12, 13, which are commonly termed tap straps, may consist of strips of copper foil with or without a surface coating of tin or other suitable metal. After assembly and drying, capacitors are impregnated with a suitable dielectric, such as mineral oil or a chlorinated aryl compound. An example of the latter is described in United States Patent 2,041,594.

Unless inhibited, as by the practice of my invention, the dielectric layer during the life of the electric apparatus becomes charged with metal derived from the metal surfaces which bound and touch the dielectric. It has been suggested that the metal which migrates into the dielectric may be present in part or in entirety as a metallic compound formed by reaction between the metallic conductor and a constituent of the dielectric liquid, the initial formation of the compound being accelerated by the presence of the steep voltage gradient at the conductor-dielectric interface.

The migration of metal is suppressed by a non-porous layer of a material of lower resistivity than the dielectric septum heretofore described. Such a material is conveniently designated as the layer of intermediate resistivity and is to be distinguished from the low resistivity impurity produced as the result of dielectric deterioration as heretofore described.

While not desiring to be limited to any particular theory, it is suggested that the function of a low resistivity adherent layer formed on the conductor is to modify the steep voltage gradient at the conductor-dielectric interface, thereby reducing the possibility of metallic ion migration from the metal into the dielectric septum.

In the case of a cupreous metal, such as copper or its alloys, the protective layer may consist of the black oxide of copper, that is, the cupric oxide, CuO. When a conductor member is to make electric contact, as in the case of the terminal conductors 12, 13, Fig. 3, the oxide either is removed from the contacting surface of the conductor, that is, from the surfaces electrically in contact with the armatures 8, 9 or, alternatively, the oxide is prevented from forming thereon. As shown in Fig. 4, the exterior part of the capacitor terminal strips may remain unoxidized, a protective oxide layer being formed as indicated only on that portion of the terminal strip which touches the dielectric septum or liquid.

When the armatures 8 and 9 are composed of aluminum, the capacitor is less subject to metal migration into the dielectric under normal conditions of use than when the armatures are composed of other metal, possibly because the thin oxide film of aluminum normally adhering to the surface of the metal suppresses migration. An oxide film anodically applied in accordance with known methods or a sulphide layer, or a layer of thin protective material as hereinafter described renders capacitors containing aluminum armatures capable of use at voltage stresses and temperatures normally considered subject to metal migration. When the armatures consist of a metal, such as copper, tin or lead, which is subject to migration, then such armatures should be coated with a protective layer.

An oxide coating can be produced on cupreous metal by heating it to an oxidizing temperature in contact with air, oxygen, or in any other suitable oxidizing medium. For example, copper conductors 5, Fig. 1, or foil 8, 9 or terminals 12, 13, Fig. 3, may be passed through the heated zone of a tubular furnace containing oxygen, or an oxidizing gaseous mixture. Sufficient oxidation may be produced at a temperature of about 600 to 800° C. for a length of time varying from about 3 to 5 minutes. Alternatively, a high resistance oxide layer may be formed on the copper conductor or foil as the result of electrolytic action. The conductor or foil may serve as the anode, for example, in an aqueous solution of boric acid and ammonium borate in equal amounts, using a current density of .16 to .25 ampere per square inch and a temperature of 75 to 83° C.

An equivalent sulphide coating can be produced by acting upon the copper with a suitable reagent, as for example an aqueous solution of potassium hydrogen sulphide, KHS, at room temperature. Alternatively, the copper conductor to be coated with sulphide may be passed through a liquid (such as mineral oil) containing free sulphur at a temperature of at least 60° C., and preferably as high as 100° C.

It has been the practice heretofore to coat the surface of copper conductors, such as 12, 13, with a thin layer of metallic tin. The presence of such a layer in no way affects the migration of metal. The tin coating rapidly becomes gray in color when submitted to voltage as heretofore described, and eventually is completely removed from the surface of the armature in contact with the dielectric septum with similar disastrous effect on the power factor and dielectric strength, as described for uncoated copper.

Although I have illustrated my invention by the beneficial effect of copper oxide or sulphide coatings, I do not wish to be limited thereto. Other protective layers characterized by a resistivity lower than that of the dielectric septum are of equal utility. Advantageous results are obtained by the application of a substantially non-porous, firmly adhering layer of semi-conducting compound derived from the reaction of the electrode material with a suitable organic or inorganic acid. For example, copper, tin, lead, silver, aluminum or iron compounds of chromic acid, phosphoric acid, carbonic acid, selenic acid, formic acid, acetic acid, citric acid and tartaric acid may be used for the protective coating. Other suitable protective layers of a more complex chemical nature are produced by heating the metallic conductor in contact with the acid compounds derived from the oxidation of mineral oil, petroleum wax or petrolatum, or from the oxidation of vegetable oils such as linseed or castor oil.

Conductor protective layers can with equal utility be formed on the electrode armature after assembly in the completed apparatus and as such come within the scope of my invention. Such protective layers may be formed, for example, by reaction of the conductor with a reactive composition made by dissolving hydrogen sulphide, or a reactive sulphur compound, as for example a mercaptan or other alkyl sulphide or pure sulphur in mineral oil or chlorinated dielectric compound used for the impregnation of the dielectric septum. Approximately one per cent of the reactive compound is used.

The dried and impregnated apparatus after assembly is heated at the reaction temperature, preferably in the range of from 60 to 100° C., under a voltage capable of producing a voltage stress equal to not more than 25 per cent of the ultimate operating stress of the apparatus. The protective film is satisfactorily formed on the conductor in a period not normally exceeding 24 hours.

In a similar manner, protective films may be formed on the electrodes by the addition of approximately .5 per cent of a nitro or amino compound such as, for example, the nitro paraffin compounds of nitro propane and nitro butane, and the amino compounds such as phenyl alpha naphthyl amine and aniline.

The benefits of my invention as applied to capacitor construction may be appreciated from the following illustrative example.

One hundred capacitors were made up, the armatures consisting of aluminum foil, the spacers consisting of eight sheets of .5 mil linen paper. As is customary in capacitor manufacture, for reasons of utility in making external connections by soldering, the terminal conductors consisted of strips of .003 inch copper foil which were unoxodized except for the scarcely perceptible film of oxygenous compound which is formed thereon unavoidably in the air under ordinary conditions.

The described assembly was rolled up on itself in the usual way and after vacuum drying was impregnated with a high grade of mineral oil of the type commonly used in capacitor manufacture. The dielectric strength of the oil initially was better than 30 kilovolts per .1 inch. The impregnated capacitors initially had a power factor of .168 at a temperature of 25° C. when operated with alternating 60 cycle current having a voltage of 2000 volts.

They were placed on test at a temperature of 75° C. and at a 60 cycle alternating potential of 3250 volts. Twenty per cent of these capacitors failed in 3 days; another 20 per cent failed in 4 days; another 20 per cent failed in 8 days; and the remaining 40 per cent failed at the end of 9 days. Upon examination the dielectric consisting of the oil-impregnated linen paper was found to be heavily loaded with copper in the neighborhood of the copper terminal conductor and to have an extremely high power factor and substantially zero dielectric strength. In like manner, the oil-impregnated linen paper contiguous to that section of the aluminum armature directly touching the copper terminal conductor also was found to be heavily loaded with copper and to possess an extremely high power factor and substantially zero dielectric strength. Power factors as high as 50 per cent were found in the paper septum contiguous with the electrode. The amount of metal compound progressively decreased with accompanying decrease in power factor and increase in dielectric strength in those layers of paper farther removed from the conductors. In the centrally located dielectric layers, little if any metal or metal compound was observed. Apparently the effect of the voltage application is to concentrate the metal or metal compound in the dielectric region adjacent to the electrode armatures.

When similar capacitors were made up utilizing conductors or terminal tap straps of copper which had been oxidized as herein described at the region where they come in contact with the oil, Fig. 4, the surfaces electrically contacting the foil electrodes being unoxidized, then, under similar conditions the initial power factor was .161 per cent. When such capacitors were operated at 25° C. at a potential of 3250 volts, no failures were observed in eight weeks. The power factor at the end of the eight-week period was .5 per cent. Substantially no copper could be observed to have migrated into the dielectric material when the capacitors were dismantled. The paper, upon testing individual layers, still had a low power factor and high dielectric strength. Extended dielectric tests covering several months even at a high voltage stress (812 V. P. M.) showed substantially no dielectric deterioration or metallic electrode migration.

When similar capacitors were tested under direct current voltage with unprotected electrode armatures as described, similar dielectric deterioration was observed. The migration of the metal from the anode was so severe as to produce visible etching, an effect substantially eliminated when the electrode is protected in accordance with the practice of my invention.

What I claim as new and desire to secure by Letters Patent of the United States is:

1. An electric device comprising the combination of juxtaposed metallic electric conductors normally charged during operation with a difference of potential capable of causing metal migration, a solid insulating medium interposed between said conductors and electrically insulating said conductors from one another, said medium being impregnated with liquid material, and a non-porous protective layer of material adherent to at least one of said conductors adjacent said insulating medium and having electric resistivity intermediate the resistivities of said conductors and said medium, said non-porous layer being capable of suppressing migration of conductor material into said insulating medium during operation of the apparatus.

2. An electric device comprising the combination of juxtaposed electric conductors, an interposed liquid-impregnated solid insulation, an adherent film provided on a surface of a conductor which is in contact with said insulation, said film being capable of substantially suppressing migration of metal into said solid insulation under the influence of an electric field between said conductors.

3. An electric device comprising the combination of juxtaposed electric conductors, one or more of which consists at least in part of cupreous metal and an interposed liquid-impregnated solid insulation, said cupreous metal being provided on the surfaces of said conductors which are in contact with said insulation with an adherent conducting film of an oxide of copper which is capable of substantially suppressing migration of metal into said solid insulation.

4. An electric device comprising the combination of juxtaposed copper conductors, a porous insulating medium containing oil interposed between said conductors, and a protective film of cupric oxide on the surface of said conductors and being in contact with said insulating medium.

5. An electric capacitor comprising cooperating armatures, interposed dielectric material consisting of liquid-impregnated solid insulating material and terminal conductors of cupreous metal for said armatures, said conductors being in contact with said dielectric material and having provided on a surface adjacent said insulating material a film of copper compound which is capable of substantially suppressing migration of metal into said dielectric material.

6. An electric capacitor comprising cooperating armatures, interposed dielectric material consisting of liquid-impregnated solid insulating material and terminal conductors for said armatures of cupreous metal which are contiguous to said dielectric material, said conductors having provided thereon a superficial film of high resistance copper oxide which is capable of substantially suppressing migration of cupreous metal into said dielectric material.

7. An electric capacitor comprising conducting armatures, interposed sheets of paper, an impregnant for said paper consisting of liquid halogenated aromatic hydrocarbon and electric conductors respectively positioned to make electric contact with said armatures, the surfaces of said conductors which are contiguous to said impregnated paper being oxidized sufficiently to substantially suppress migration of metal into said paper, the surfaces making electric contact with said armatures being unoxidized.

8. An electric cable comprising a conductive core of copper, a surrounding layer of porous insulation which is susceptible to liquid impregnation, a liquid insulating impregnant therein, a metal sheath surrounding said insulating layer, said copper core being provided with an adherent film of black or cupric oxide of copper whereby migration of metal into said layer of insulation is suppressed.

FRANK M. CLARK.